(12) United States Patent
Wilson

(10) Patent No.: US 9,245,572 B2
(45) Date of Patent: Jan. 26, 2016

(54) OPTICAL TAPE PICK UP UNIT WITH HOLOGRAPHIC OPTICAL ELEMENT

(71) Applicant: Oracle International Corporation, Redwood City, CA (US)

(72) Inventor: Scott D. Wilson, Thronton, CO (US)

(73) Assignee: Oracle International Corporation, Redwood City, CA (US)

( * ) Notice: Subject to any disclaimer, the term of this patent is extended or adjusted under 35 U.S.C. 154(b) by 29 days.

(21) Appl. No.: 13/682,915

(22) Filed: Nov. 21, 2012

(65) Prior Publication Data

US 2014/0140184 A1  May 22, 2014

(51) Int. Cl.

| G11B 7/1353 | (2012.01) |
|---|---|
| G11B 7/1374 | (2012.01) |
| G11B 7/1395 | (2012.01) |
| G11B 7/1392 | (2012.01) |
| G11B 7/003 | (2006.01) |
| G11B 7/0045 | (2006.01) |

(52) U.S. Cl.
CPC ............ G11B 7/1395 (2013.01); G11B 7/1353 (2013.01); G11B 7/13922 (2013.01); *G11B 7/003* (2013.01); *G11B 7/00458* (2013.01); *G11B 7/1374* (2013.01)

(58) Field of Classification Search
None
See application file for complete search history.

(56) References Cited

U.S. PATENT DOCUMENTS

| 4,826,270 | A | * | 5/1989 | Opheij et al. ................. 369/100 |
| 4,918,679 | A | * | 4/1990 | Opheij et al. ............. 369/44.23 |
| 5,272,690 | A | * | 12/1993 | Bargerhuff et al. ...... 369/112.09 |
| 5,490,133 | A | * | 2/1996 | Nakamura ........... G11B 7/0901 |
| | | | | 369/112.05 |
| 5,835,471 | A | | 11/1998 | Miyamoto et al. |
| 6,424,608 | B1 | | 7/2002 | Takeuchi |
| 2005/0041559 | A1 | * | 2/2005 | Hendriks et al. ......... 369/112.01 |
| 2007/0211606 | A1 | * | 9/2007 | Nakamura et al. ....... 369/112.25 |
| 2010/0002313 | A1 | * | 1/2010 | Duparre et al. ............... 359/742 |
| 2013/0051203 | A1 | | 2/2013 | Mahnad |
| 2013/0077456 | A1 | * | 3/2013 | Takahashi ............. G11B 7/133 |
| | | | | 369/53.23 |
| 2013/0083641 | A1 | * | 4/2013 | Kobayashi et al. ........ 369/53.28 |
| 2013/0235708 | A1 | | 9/2013 | Wilson |

FOREIGN PATENT DOCUMENTS

| EP | 1209669 A2 | 5/2002 |
| EP | 1489604 A1 | 12/2004 |
| WO | 2007092785 A2 | 8/2007 |
| WO | WO2007092785 A2 | 8/2007 |

OTHER PUBLICATIONS

International Search Report and Written Opinion of the International Searching Authority dated Dec. 20, 2013 for International Application No. PCT/US2013/063973, 13 pgs.
International Preliminary Report on Patentability and Written Opinion of the International Searching Authority for PCT/US2013/063973, dated May 26, 2015, 9 pages.

\* cited by examiner

*Primary Examiner* — Wayne Young
*Assistant Examiner* — Mark Fischer
(74) *Attorney, Agent, or Firm* — Brooks Kushman P.C.

(57) ABSTRACT

An optical tape pick up unit includes a holographic optical element and an aspheric objective lens. The holographic optical element splits a laser beam into first order beams and introduces pre-compensating wavefront error into the first order beams. The aspheric objective lens focuses the first order beams onto optical tape and introduces wavefront error into the first order beams having a magnitude similar to and polarity opposite that of the pre-compensating wavefront error.

15 Claims, 4 Drawing Sheets

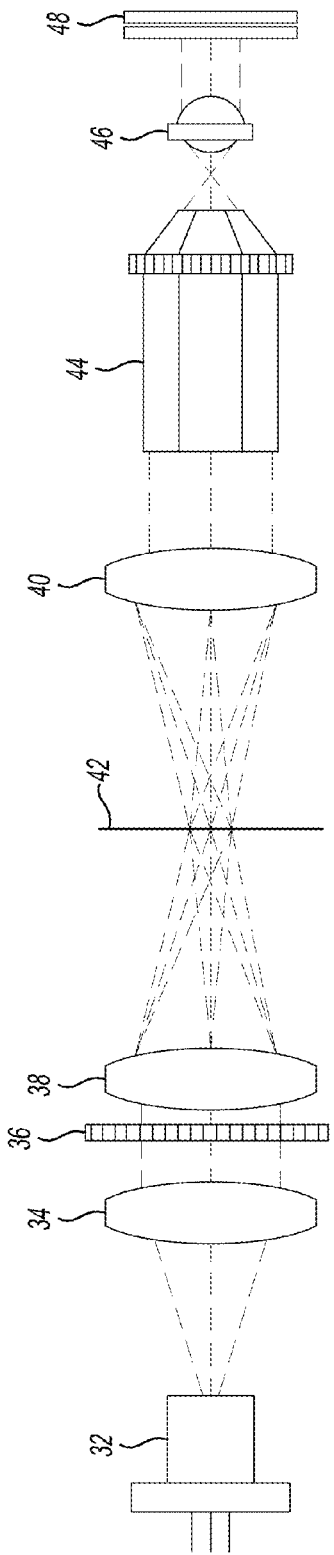
_Fig-6_
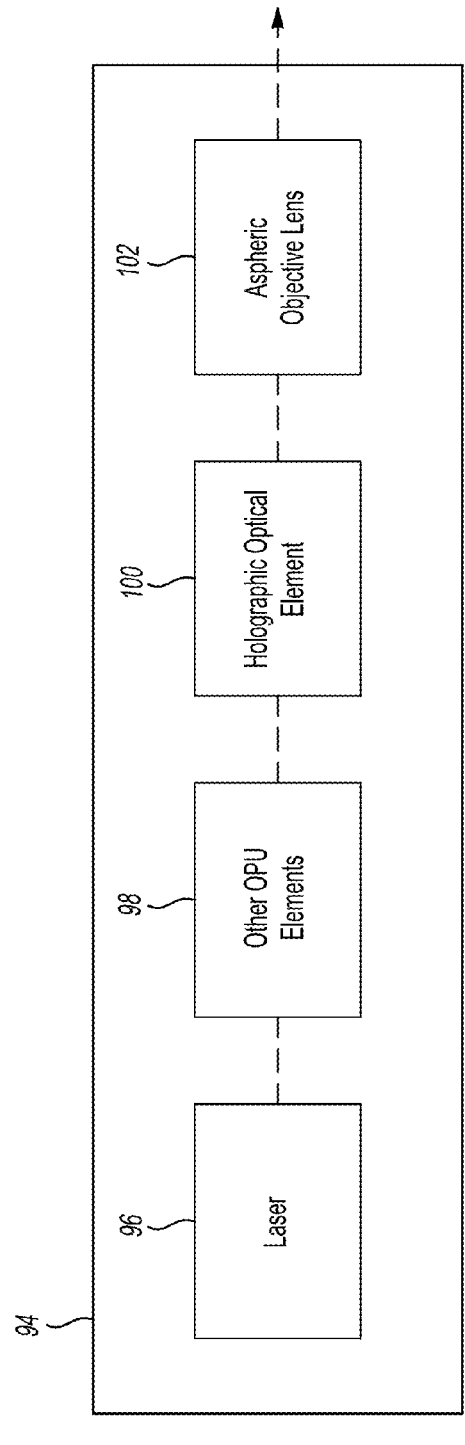
_Fig-9_

OPTICAL TAPE PICK UP UNIT WITH HOLOGRAPHIC OPTICAL ELEMENT

TECHNICAL FIELD

This disclosure relates to optical tape systems.

BACKGROUND

Optical tape is a data storage medium. In certain examples, it can take the form of long narrow strips onto which patterns can be written and from which patterns can be read. Optical tape may facilitate higher data transfer rates, greater storage capacity, and reduced access times relative to magnetic tape. Moreover because optical tape is written and read using optical pick up units that do not touch the recording surface of the tape, it may be more durable than magnetic tape.

Optical tape is being explored to meet future high capacity tape demands by incorporating multiple optical pick up units (OPUs) in a drive. A tape drive employing optical technology should be cost-competitive compared to existing magnetic tape drives. With as many as 24 or more OPUs in each drive, low OPU cost could be desirable.

SUMMARY

An optical tape pick up unit includes a holographic optical element and an aspheric objective lens. The holographic optical element splits a laser beam into first order beams and introduces wavefront error into the first order beams. The aspheric objective lens focuses the first order beams onto optical tape and introduces wavefront error into the first order beams. The wavefront error introduced by the holographic optical element offsets the wavefront error introduced by the aspheric objective lens to reduce resulting wavefront error of the focused first order beams. The aspheric objective lens may be a no cover glass aspheric objective lens. The aspheric objective lens may have only a single glass element. The holographic optical element may be a volume phase holographic grating. The resulting wavefront error may have a value less than 50 milliwaves.

An optical tape system includes an optical tape pick up unit. The optical tape pick up unit includes a holographic optical element. The holographic optical element splits a laser beam into +1 and −1 order beams and introduces wavefront error of specified polarity and magnitude into each of the +1 and −1 order beams. The system may include an aspheric objective lens that focuses the +1 and −1 order beams onto optical tape. The aspheric objective lens may introduce wavefront error into each of the +1 and −1 order beams. The wavefront error introduced into the +1 order beam by the aspheric objective lens may have a polarity opposite that of the wavefront error introduced into the +1 order beam by the holographic optical element. The wavefront error introduced into the −1 order beam by the aspheric objective lens may have a polarity opposite that of the wavefront error introduced into the −1 order beam by the holographic optical element. The wavefront error introduced into the +1 order beam by the aspheric objective lens may have a magnitude approximately equal to that of the wavefront error introduced into the +1 order beam by the holographic optical element. The wavefront error introduced into the −1 order beam by the aspheric objective lens may have a magnitude approximately equal to that of the wavefront error introduced into the −1 order beam by the holographic optical element. The aspheric objective lens may be a no cover glass aspheric objective lens. The aspheric objective lens may have only a single glass element. The holographic optical element may be a volume phase holographic grating.

An optical tape system includes an optical tape pick up unit. The optical tape pick up unit includes a holographic optical element and an aspheric objective lens arranged such that first order beams focused by the aspheric objective lens onto an optical tape have wavefront error of less than 50 milliwaves. The aspheric objective lens may be a no cover glass aspheric objective lens. The aspheric objective lens may have only a single glass element. The holographic optical element may be a volume phase holographic grating.

BRIEF DESCRIPTION OF THE DRAWINGS

FIGS. 6 and 7 are schematic diagrams of setups for recording volume phase holographic optical elements.

FIG. 9 is a schematic diagram of another optical tape recording system.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
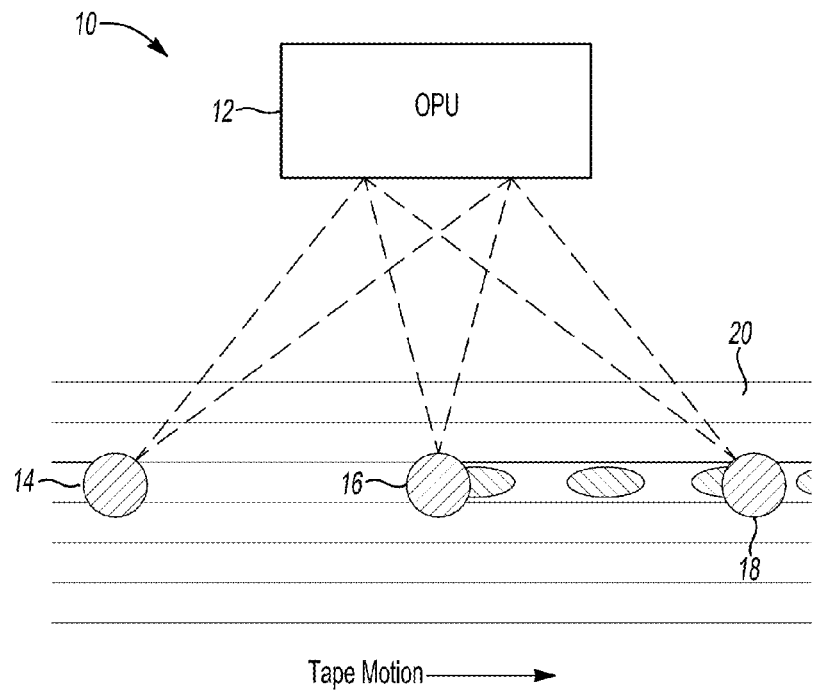
FIG. 1 is a schematic diagram of an optical tape recording system.

Direct read after write (DRAW) is often a feature of enterprise level optical tape recording systems. Its purpose is to verify that data has been correctly recorded on optical tape immediately after it has been written. Referring to FIG. 1, one method for achieving DRAW in an optical recording system 10 involves using a single optical pickup unit (OPU) 12 with three laser spots 14, 16, 18 focused on a media 20. In this three spot DRAW scheme, while the central main spot 16 is used for writing data, one of the two satellite spots 14, 18, located on either side of the main spot 16, is used to verify data written by the main spot 16 immediately thereafter.

Typical satellite-to-main-spot spacing can be approximately 10 microns. To maintain reasonable OPU component cost, a molded aspheric objective lens is typically employed to form the laser spots at the media surface. Such an asphere has surface profiles that are not portions of a sphere or cylinder. These complex surface profiles can reduce or eliminate spherical aberration and also reduce other optical aberrations, such as distortion, coma, etc., compared to a simple lens. That is, a single aspheric lens can often replace a much more complex multi-lens system. The resulting device is smaller and lighter, and sometimes less costly than multi-lens designs. High numerical aperture single element aspheric lenses, however, have a limited field of view. Hence while the main spot centered on the optical axis has acceptable optical performance, the two satellite spots offset, for example, by approximately 10 microns from the main spot are degraded, meaning they have lower optical performance compared to the main spot.

One solution to address this limited field of view issue in some optical recording systems is to use multi-element objective lens assemblies. A two-element aspheric objective lens and a single frequency diffraction grating, for example, could be used to generate the three spots at the media plane. A two-element lens assembly, however, is more costly than a single asphere due to the additional cost of the second element along with increased assembly cost from the precise alignment required of the two lens elements. In addition, the extra weight of the two-element objective lens either degrades performance of the focus and tracking actuator or requires a more powerful focus and tracking actuator in order to achieve comparable servo performance. Put a different way, multi-element objective lens assemblies enjoy a wider field of view but with significantly higher cost and weight-both undesirable characteristics in optical recording drive components.

The reduced field of view in single aspheric lenses—characterized by higher wavefront error, larger spot size, and lower resolution—can degrade the optical system's ability to perform the DRAW function. Certain embodiments described herein attempt to address this issue by compensating for the wavefront error in the satellite spots when using the lower cost, lower weight single aspheric lens. Hence, certain embodiments may enable an optical design to meet functional requirements at lower OPU cost.

Figure 2:
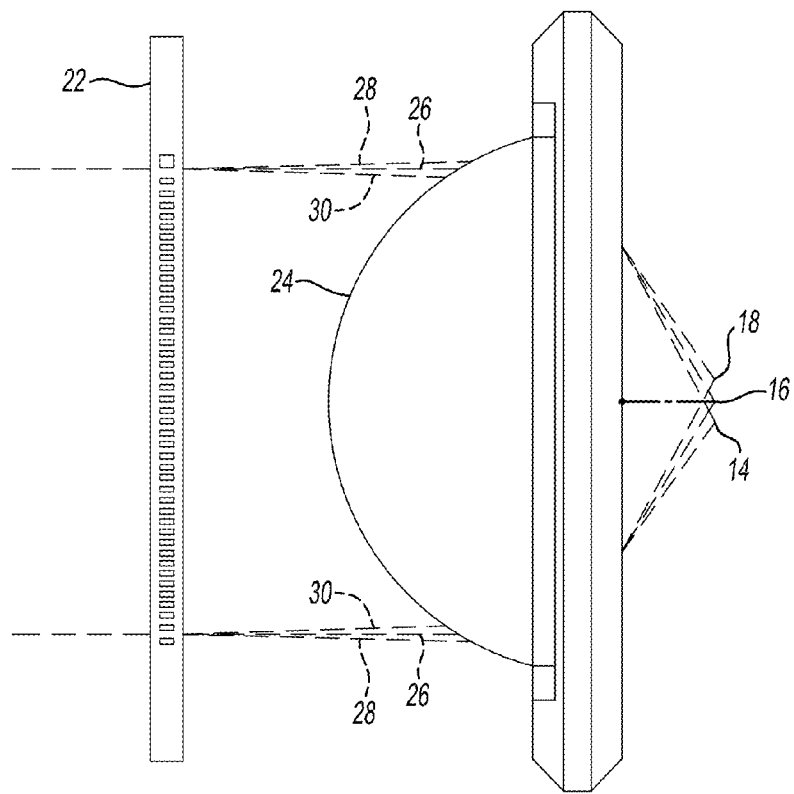
FIG. 2 is a side view of a portion of an optical tape recording system.

Referring to FIG. 2, the pair of satellite spots 14, 18 may be generated at the media recording plane by placing a single frequency diffraction grating 22 in an OPU's optical path preceding an objective lens 24. The main (central) spot 16 is formed by focusing an un-diffracted (zero order) laser beam 26 through the grating 22. The satellite spots 14, 18 are created when the objective lens 24 focuses diffracted (+1 order and −1 order) beams 28, 30 exiting the grating 22.

In some commercial optical disk drives, the satellite spots 14, 18 are used for purposes other than DRAW. They are used, for example, to generate a special version of the tracking servo error signal known as differential push-pull, and may not require the same optical performance as the main spot 16. If the satellite spots 14, 18 are instead used for DRAW, they may need to have optical performance (resolution) comparable to that of the main spot 16. Therefore, their wavefront error can be compensated to a level similar to the main (on-axis) spot 16.

Figure 3:
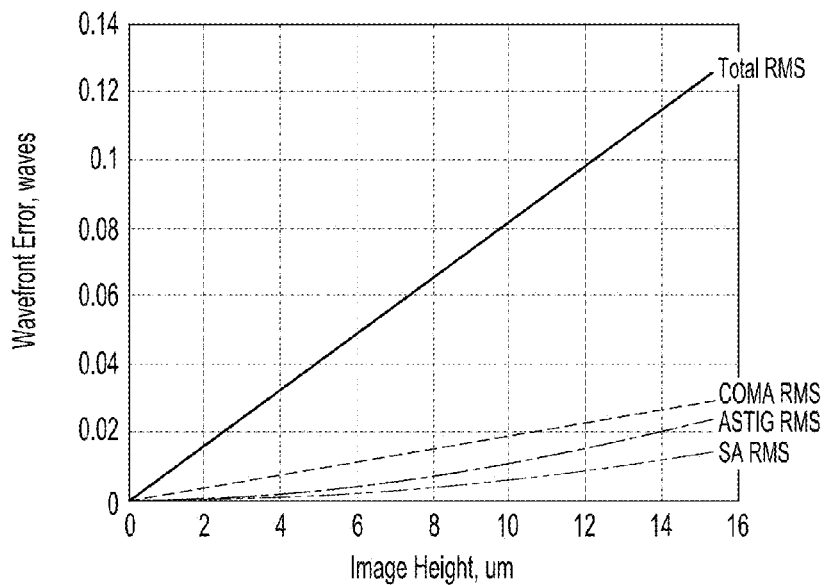
FIG. 3 is a plot of wavefront error vs. image height for a high numerical aperture (NA=0.85) no cover glass aspheric objective lens.

Referring to FIG. 3, satellite spots produced at a focal length of 1.765 millimeters by a no cover glass asphere having a numerical aperture of 0.85 and located 10 microns from the main spot would have approximately 0.080 waves of total root mean square (RMS) wavefront error. Hence, the satellite spots would be significantly degraded and have unacceptable resolution for this particular aspheric lens design. Increased satellite spot spacing would further exacerbate total RMS wavefront error in a somewhat linear fashion.

Components of the total RMS wavefront error include spherical aberration (SA) RMS wavefront error, coma aberration (COMA) RMS wavefront error, and astigmatic aberration (ASTIG) RMS wavefront error. Spherical aberration is the only form of monochromatic axial aberration produced by rotationally symmetrical surfaces centered and orthogonal in regard to the optical axis. Spherical aberration will appear whenever optical surface form does not properly match that of the incident wavefront. Thus, it is induced with change of object distance or with multi-surface objectives having deviations in proper spacing. Spherical aberration affects the entire image field, including the very center. Generally, coma aberration occurs either due to the incident wavefront being tilted or decentered with respect to the optical surface. Hence, it is either an aberration affecting off-axis image points or the result of axial misalignment of optical surfaces, respectively. Similar to coma, astigmatic aberration is caused by the inclination of incident wavefronts relative to the optical surface. While coma always originates at the optical surface, astigmatism in its simplest form results from the projectional asymmetry arising from the wavefront's inclination to the surface.

Figure 4:
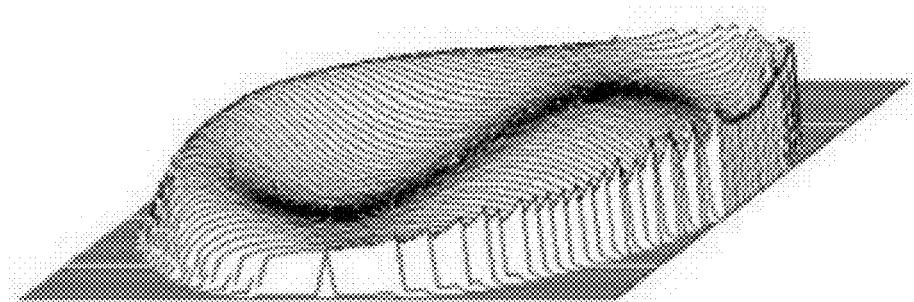
FIGS. 4 and 5 are wavefront error contour plots for first order beams.
Figure 5:
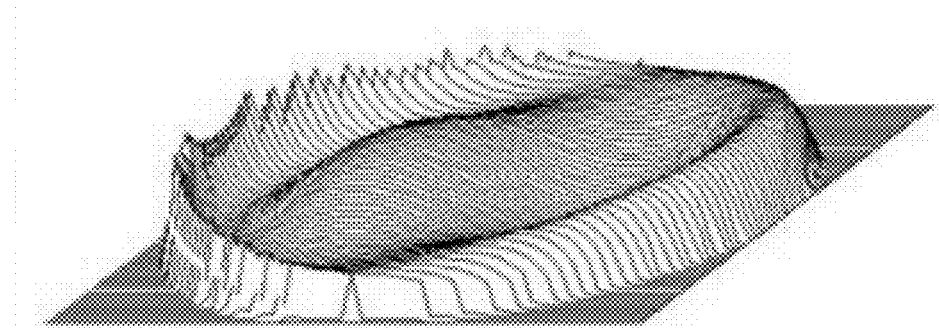

Referring to FIGS. 4 and 5, +1 order and −1 order diffracted beams have opposite polarity. Because wavefront errors for these beams are inverted, a diffractive optical element could be designed to correct the wavefront error in one satellite spot, but not in both satellite spots simultaneously. Hence, a simple phase or amplitude modulated diffractive optical element designed to correct one satellite spot would cause twice the wavefront error in the other spot.

Holographic optical elements (HOEs) such as volume phase holographic (VPH) transmission gratings work much like conventional surface relief reflection gratings, except in transmission. They are periodic phase structures whose fundamental purpose is to diffract different wavelengths of light from a common input path into different angular output paths. A VPH grating can be formed in a layer of transmissive material, usually dichromated gelatin, which is sealed between two layers of clear glass or fused silica. The phase of incident light is modulated as it passes through the optically thick film that has a periodic differential hardness or refractive index (hence the term "volume phase.") Put a different way, light travelling through a VPH grating undergoes diffraction due to bulk refractive index modulation. This is in contrast to a conventional grating in which the depth of a surface relief pattern modulates the phase of the incident light. As with conventional reflection gratings, the spatial frequency of the periodic structure determines the spectral dispersion or angular separation of wavelength components in the diffracted light. The average refractive index, the refractive index differential or modulation, and the thickness of the film determine the efficiency, polarization, and bandwidth performance characteristics of the grating.

Because the diffraction mechanism of VPH gratings occurs through the bulk material and without absorption modulation, they give rise to several interesting properties: (1) a theoretical efficiency of 100%, (2) transmission or reflection gratings can be produced depending on the Bragg plane orientation, and (3) undiffracted wavelengths travelling through the grating are not perturbed and can be reused for further purposes. Hence, a HOE can be used to generate satellite spots while at the same time compensating the wavefront error in those spots. The main spot, i.e., the zero order diffractive term, is not affected by the HOE. That is, a VPH grating with its inherent angular selectivity can be created to simultaneously compensate the wavefront error in both satellite spots.

As mentioned above, VPH gratings can generally be formed in a layer of transmissive material, usually dichromated gelatin, which is sealed between two layers of clear glass or fused silica. More specifically, VPH gratings may be fabricated by the following example method. A photopolymer-based holographic recording film is applied between two glass substrates. The desired diffractive pattern is recorded optically in the film in the form of a phase modulated volume hologram. The desired pattern is recorded by creating an interference between two laser beams, one perfect (collimated and with zero wavefront error) and one containing the inverse of the wavefront error to be corrected. One of the aspheric objective lenses to be corrected could be used in the optical setup for the hologram recording. After "fixing" the diffractive pattern in the recording film layer and applying anti-reflective coatings to the outer surfaces of the substrates, the HOEs are diced into individual elements.

Referring to FIG. 6, a setup for recording a volume phase holographic optical element may include a laser diode 32, collimating lens 34, and diffraction grating 36. The setup may further include lens 38, 40 having a pinhole array 42 disposed there between. The setup may also include a high quality microscope objective lens 44 and aspheric objective lens 46. The aspheric objective lens directs optical beams onto holographic recording film 48. All optical components, other than the aspheric objective lens 46, may be designed or selected to have very high optical performance, i.e., low wavefront error, so that the holographic recording file 48 records only the wavefront variation introduced by the aspheric objective lens 46 and not errors attributed to other components in the setup.

Figure 7:
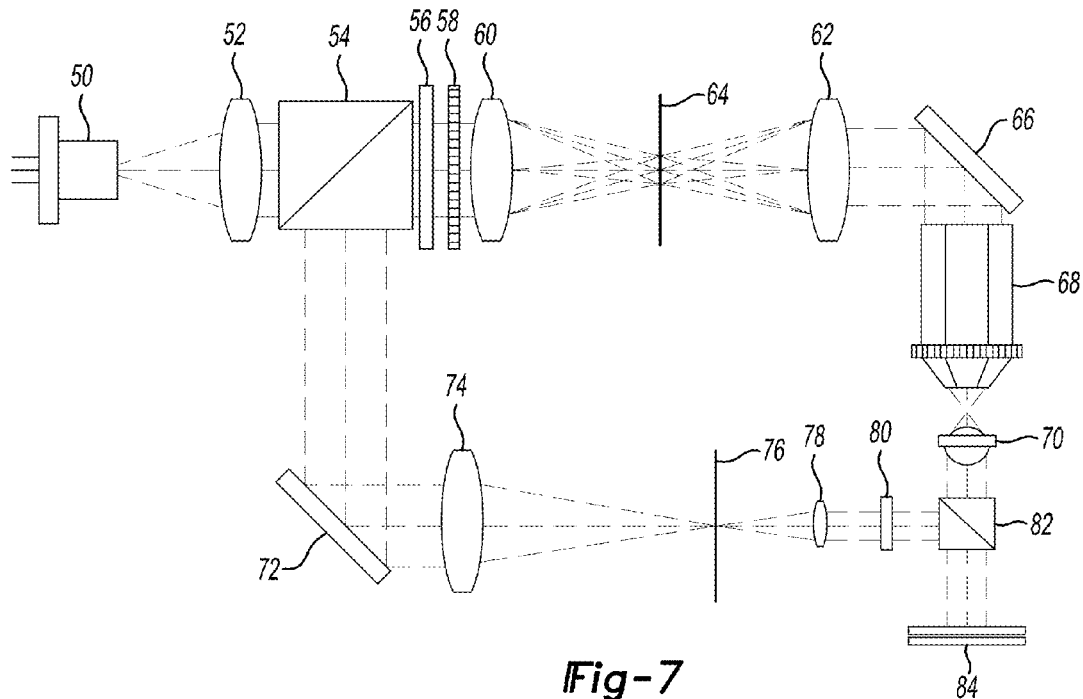

Referring to FIG. 7, another setup for recording a volume phase holographic optical element may include a laser diode 50, collimating lens 52, and polarizing beam splitter 54. The polarizing beam splitter 54 creates two separate optical paths. The first optical path may include a retarder 56, grating 58, and lens 60, 62 having a reflective pinhole array 64 disposed there between. The first optical path may further include mirror 66, objective lens 68, and aspheric objective lens 70. The second optical path may include mirror 72, lens 74, pinhole 76, lens 78, and retarder 80. Finally, the setup may include an amplitude beam splitter 82. The separate optical paths created by the polarizing beam splitter 54 are combined by the amplitude beam splitter 82 and directed onto holographic film 84.

In this setup, the zero order (un-diffracted) beam from the lens 60 is reflected by the mirrored pinhole array 64 while the +1 order and −1 order diffracted beams pass through it. The polarizing beam splitter 54 and quarter wave plate ($\lambda/4$ retarder) 56 act as an optical isolator, reflecting the zero order beam along a separate optical path. As mentioned above, the beams re-combine at the amplitude beam splitter 82 and then interfere at the holographic recording film 84. The half wave ($\lambda/2$) plate retarder 80 rotates the polarization to match that of the +1 order and −1 order beams so they will interfere properly at the film plane. Hence, the zero order beam can be made to have nearly zero wavefront error before re-combining with the other two beams. Other setups are of course also possible.

Figure 8:
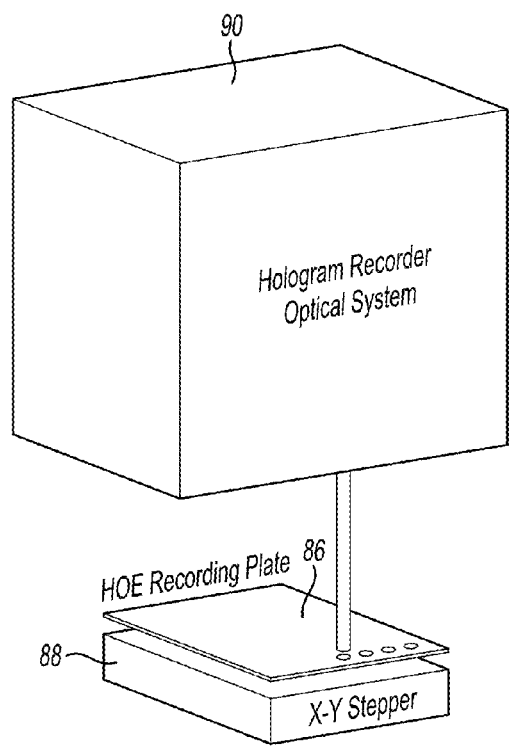
FIG. 8 is a schematic diagram of a high volume recording system.

The setups described herein can be arranged with other equipment to form high volume recording systems to efficiently create large numbers of holograms. Referring to FIG. 8 for example, a holographic recording plate 86, perhaps up to 12 inches by 12 inches, may be mounted on an automated X, Y stage 88 for step-and-repeat recording of holograms via hologram recorder optical system 90. As an example, more than 3,500 5 millimeter by 5 millimeter holograms could be recorded on the 12 inch square plate 86. After recording and fixing the patterns, individual holograms can be diced up in a fashion similar to integrated circuits or other wafer-scale optical components for use in optical tape pick up units.

Referring to FIG. 9, an optical tape system 92 includes, inter alia, at least one OPU 94. The OPU 94 includes a laser 96, other OPU elements 98 (as is common), HOE 100, and aspheric objective lens 102. The optical path through these elements is depicted by heavy line. The HOE 100 pre-compensates wavefront error of the +1 order and −1 order diffracted beams before entering the aspheric objective lens 102. That is, the HOE 100 introduces wavefront error into the +1 order beam that is of a magnitude approximately equal to and a polarity opposite that of the wavefront error introduced into the +1 order beam by the aspheric objective lens 102, and introduces wavefront error into the −1 order beam that is of a magnitude approximately equal to and a polarity opposite that of the wavefront error introduced into the −1 order beam by the aspheric objective lens 102. Hence, the wavefront error of the +1 order and −1 order diffracted beams exiting the aspheric objective lens 102 can be, for example, 50 milliwaves or less.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An optical tape pick up unit comprising:
    a holographic optical element configured to split a laser beam into a zero order beam and first order beams, and to introduce wavefront error via diffraction into the first order beams but not the zero order beam; and
    an aspheric objective lens configured to focus the beams onto optical tape and to introduce wavefront error into the first order beams, wherein the wavefront error introduced by the element offsets the wavefront error introduced by the lens to reduce resulting wavefront error of the focused first order beams.

2. The unit of claim 1 wherein the lens is a no cover glass aspheric objective lens.

3. The unit of claim 1 wherein the lens has only a single glass element.

4. The unit of claim 1 wherein the element is a volume phase holographic grating.

5. The unit of claim 1 wherein the resulting wavefront error has a value less than 50 milliwaves.

6. The unit of claim 1 wherein the resulting wavefront error has a value less than 40 milliwaves.

7. An optical tape pick up system comprising:
    an optical tape pick up unit including a holographic optical element configured to split a laser beam into 0, +1, and −1 order beams and to introduce wavefront error of specified polarity and magnitude via diffraction into each of the +1 and −1 order beams but not the 0 order beam; and an aspheric objective lens configured to focus the beams onto optical tape and to introduce wavefront error into each of the +1 and −1 order beams, wherein the wavefront error introduced into the +1 order beam by the lens has a polarity opposite that of the wavefront error introduced into the +1 order beam by the element and wherein the wavefront error introduced into the −1 order beam by the lens has a polarity opposite that of the wavefront error introduced into the −1 order beam by the element.

8. The system of claim 7 wherein the wavefront error introduced into the +1 order beam by the lens has a magnitude approximately equal to that of the wavefront error introduced into the +1 order beam by the element and wherein the wavefront error introduced into the −1 order beam by the lens has a magnitude approximately equal to that of the wavefront error introduced into the −1 order beam by the element.

9. The system of claim 7 wherein the lens is a no cover glass aspheric objective lens.

10. The system of claim 7 wherein the lens has only a single glass element.

11. The system of claim 7 wherein the element is a volume phase holographic grating.

12. An optical tape system comprising:

an optical tape pick up unit including a holographic optical element configured to introduce wavefront error via diffraction into first order beams and an aspheric objective lens arranged such that the first order beams focused by the aspheric objective lens onto an optical tape have wavefront error of less than 50 milliwaves.

13. The system of claim 12 wherein the lens is a no cover glass aspheric objective lens.

14. The system of claim 12 wherein the lens has only a single glass element.

15. The system of claim 12 wherein the element is a volume phase holographic grating.

* * * * *